July 13, 1943.  M. A. EDWARDS  2,324,293

POWER SYSTEM

Filed March 26, 1942

Inventor:
Martin A. Edwards,
by Harry E. Dunham
His Attorney.

Patented July 13, 1943

2,324,293

UNITED STATES PATENT OFFICE 2,324,293

POWER SYSTEM

Martin A. Edwards, Scotia, N. Y., assignor to General Electric Company, a corporation of New York Application March 26, 1942, Serial No. 436,259

19 Claims. (Cl. 171—223)

My invention relates to power systems and particularly to such systems as are used for driving rail vehicles.

This application is a continuation-in-part of my application Serial No. 422,959, filed December 15, 1941.

An object of my invention is to provide an improved engine-generator power system for utilizing the engine power at its highest efficiency.

Another object of my invention is to provide an improved excitation system for a generator adapted to be driven by an internal combustion engine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
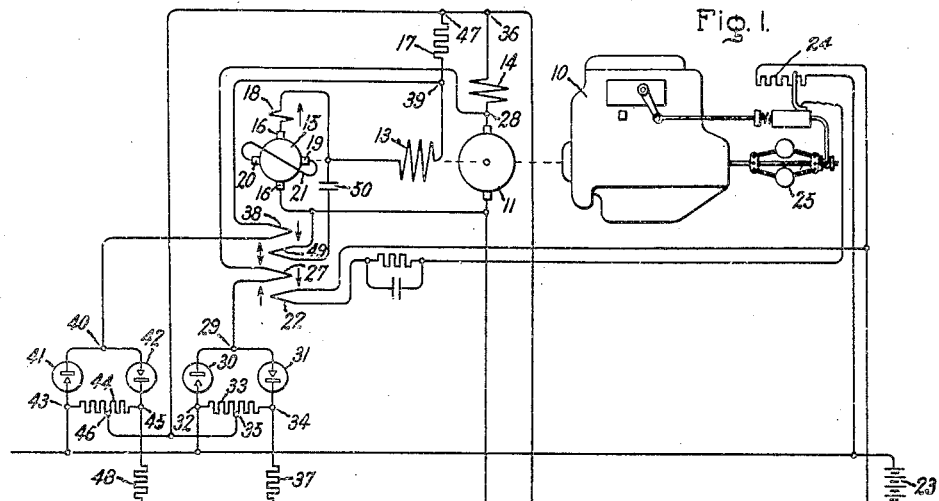
Figure 2:
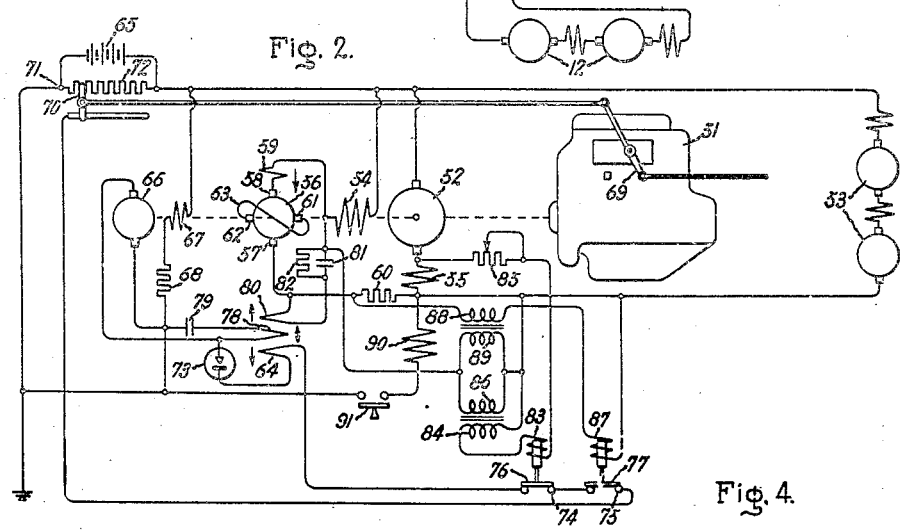
Figure 3:
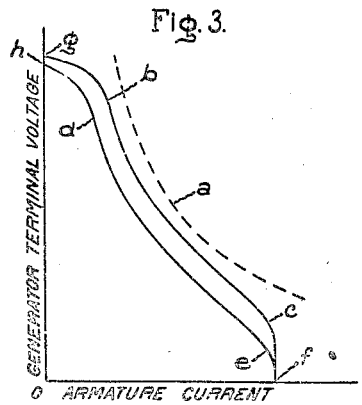
Figure 4:
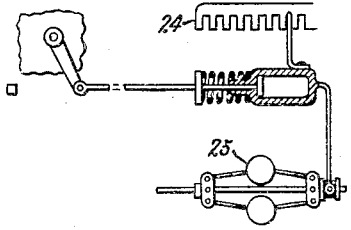

In the drawing, Fig. 1 is a schematic illustration of one embodiment of my invention; Fig. 2 is a schematic illustration of another embodiment of my invention; Fig. 3 is a curve illustrating the characteristics obtainable from the power systems shown in Figs. 1 and 2; and Fig. 4 is an enlarged view partly in section of the governor control shown in Fig. 1.

Referring to the drawing, I have shown in Fig. 1 an engine 10 arranged to drive a main generator provided with an armature 11 connected to supply power to series driving motors 12. The characteristics of the generator are controlled by a main field exciting winding 13, and a commutating field exciting winding 14 in series with the main load on the generator is provided for improving the commutation of the machine. The main field exciting winding 13 is adapted to be energized by an amplidyne exciter generator 15 or other suitable armature reaction excited dynamo-electric machine arranged with its secondary brushes 16 connected in opposition to the voltage of the main generator armature 11 and connected in series with a resistance 17. The amplidyne exciter 15 is provided with a conventional compensating field exciting winding 18 and provided with a set of primary brushes 19 and 20 which are short-circuited by an external conductor 21 to complete a primary circuit therethrough.

Internal combustion engines generally are substantially constant torque machines and, if properly governed, generally operate at substantially constant speed, thereby providing a substantially constant power output as indicated by curve a in Fig. 3. It is desirable, therefore, that the generator load together with its losses should be substantially constant in order to utilize the engine at its maximum efficiency. Furthermore, if the generator load current rises above a predetermined value, the heating of the generator may become excessive and damage may result. It is desirable, therefore, that the maximum current output of the generator be limited to some predetermined maximum value. These two characteristics of the main generator are obtained by varying the energization provided by the dynamo-electric exciter means to regulate the power output of the main dynamo-electric machine or generator by proper control of its main field exciting winding. However, this main field exciting winding also may be damaged if the current in this field exciting winding exceeds a predeterminable maximum value, and it is desirable, therefore, that this field current also should be limited to some predetermined maximum value.

The amplidyne exciter 15 is provided with a field exciting winding 22 which is connected across a source of electrical power supply including a battery 23 arranged in series with a variable resistor 24. The excitation of the field exciting winding 22 is adapted to supply the main control component of excitation to the amplidyne exciter 15. The resistance in this circuit is adapted to be varied in accordance with the speed of the engine and is controlled by a governor 25 responsive to the speed engine 10. This governor is shown in detail in Fig. 4 and is adapted to decrease the resistance 24 in series with the field exciting winding 22 when the speed of the engine decreases and to increase the resistance 24 in series with the field exciting winding 22 when the speed of the engine 10 increases. This tends to vary the excitation provided by the field exciting winding 22 inversely with the speed of the engine, tending to vary the energization of the main generator field exciting winding 13 inversely with the engine speed. Thus, the load on the generator will tend to vary inversely with the speed of the engine and will tend to hold this speed substantially constant. The governor also has the effect of changing the throttle setting of the engine 10 if the generator load control is not sufficient to maintain the desired speed. This main control component of excitation, therefore, will vary with variations in the speed of the engine, so as to maintain substantially constant power output on the engine within a given range of load current and voltage variations below a predetermined electric current.

The generator voltage-current characteristic for this condition of operation is represented by the curve b—c in Fig. 3 for a given throttle setting, and the difference between the curve b—c and the curve a represents the losses of the system, that is, the difference between the engine output and the main generator output. It is to be noted that the power output from b to c plus the losses of the electrical generating equipment, machines and exciting system, equal the substantially constant output power of the engine as shown by curve a. At the higher current values the electrical losses are higher and the curve b—c varies more from the curve a. The generator characteristic curve h—d—e—f is for another engine throttle setting.

In order to limit the maximum current of the main generator, a field exciting winding 27 is arranged on the secondary commutating axis of the amplidyne generator and is adapted to provide a component of excitation thereto in opposition to the component of excitation provided by the field exciting winding 22 when the main generator load current exceeds a predetermined value to reduce the excitation of the amplidyne exciter under this condition. This is obtained by connecting this field exciting winding across a potentiometer arrangement such that the field exciting winding remains deenergized below a predetermined load current, above which the energization of the winding is dependent upon the value of the main generator load current. One terminal of the field exciting winding 27 is connected to one side 28 of the main generator commutating field exciting winding 14, and the other terminal thereof is connected to a central point 29 between a pair of rectifiers 30 and 31, which may be of the copper oxide type. The other side of the rectifier 30 is connected to a terminal 32 of a potentiometer resistance 33, and the other side of the rectifier 31 is connected to the other terminal 34 of the potentiometer resistance 33. The central point 35 of the potentiometer resistance 33 is connected to the other terminal 36 of the main generator commutating field exciting winding 14. The terminals 32 and 34 of the potentiometer resistance 33 are connected across a source of electrical power supply, such as the battery 23, in series with a resistance 37. The rectifiers 30 and 31 are connected across the resistance 33 and the battery 23 in such a manner as to prevent a short circuit across the resistor and the battery. The commutating field exciting winding 14 is connected across one branch of the resistor 33 between the terminals 34 and 35, such that as long as the drop across the commutating field exciting winding 14 remains higher than the drop across this branch of the resistor 33, current will not flow through the field exciting winding 27. However, when the drop across the field exciting winding 14 exceeds the drop across the resistor 33 between the terminals 34 and 35, current will pass through the field exciting winding 27, thereby energizing the same in proportion to the drop across the commutating field exciting winding which is proportional to and dependent on the load current of the main generator 11. The rectifier 30 prevents the flow of current through the field exciting winding 27 in the opposite direction. Thus, when the load on the main generator exceeds a predetermined amount, the field exciting winding 27 tends to decrease the excitation of the amplidyne exciter 15 which decreases the excitation of the main generator field exciting winding 13, causing the main generator to drop some of its load. In this manner, the field exciting winding 27 of the amplidyne exciter will automatically and inherently limit the maximum load current on the main generator. This operation is represented by curves c—f and e—f in Fig. 3.

In order to limit the maximum current of the main generator field exciting winding 13 to a safe operating value, a field exciting winding 38 is arranged on the secondary commutating axis of the amplidyne generator 15 and is adapted to provide a component of excitation thereto in opposition to the component of excitation provided by the control field exciting winding 22 when the current of the field exciting winding 13 of the main generator exceeds a predetermined value. This is obtained by connecting this field exciting winding across a potentiometer arrangement such that the field exciting winding 38 remains deenergized below a predetermined main generator field current, above which the energization of the winding is dependent upon the value of the current through the field exciting winding 13. One terminal of the field exciting winding 38 is connected to one side 39 of the resistance 17 in series with the field exciting winding 13, and the other terminal is connected to a central point 40 between a pair of rectifiers 41 and 42, which may be of the copper oxide type. The other side of the rectifier 41 is connected to a terminal 43 of a potentiometer resistance 44, and the other side of the rectifier 42 is connected to the other terminal 45 of the potentiometer resistance 44. The central point 46 of the potentiometer resistance 44 is connected to the other terminal 47 of the resistance 17. The terminals 43 and 45 of the potentiometer resistance 44 are connected across a source of electrical power supply, such as the battery 23, in series with a resistance 48. The rectifiers 41 and 42 are connected across the resistance 44 and the battery 23 in such a manner as to prevent a short circuit across the resistor and the battery. The resistance 17 is connected across one branch of the resistor 44 between the terminals 45 and 46, such that as long as the drop across the resistance 17, that is, the current in the field exciting winding 13, remains higher than the drop across this branch of the resistor 44, current will not flow through the field exciting winding 38. However, when the drop across the resistance 17 exceeds the drop across the resistor 44 between the terminals 45 and 46, current will pass through the field exciting winding 38, thereby energizing the same in proportion to the drop across the resistance 17 which is proportional to the current in the field exciting winding 13. Thus, when the current in the field exciting winding 13 exceeds a predetermined amount, the energization of the field exciting winding 38, which is dependent on the energization of winding 13, tends to decrease the excitation of the amplidyne exciter 15 which decreases the excitation of the main generator field exciting winding 13. In this manner, the field exciting winding 38 of the amplidyne exciter will automatically limit the maximum energization current in the field exciting winding 13 substantially to a predetermined maximum value. This produces the main generator characteristic curve represented in Fig. 3 by curves g—b and h—d.

In order to stabilize the operation of the excitation system, a field exciting winding 49 is connected in series with a condenser 50 across the secondary terminals of the amplidyne exciter 15. This field exciting winding normally is not energized, but if the amplidyne exciter tends to become unstable, the field exciting winding 49 will be energized by the variations in the voltage thereacross, and it is arranged on the machine to provide a component of excitation thereto which tends to generate voltage therein in opposition to the voltage change causing the energization of the field exciting winding 49, thereby tending to damp out such transient variations and to stabilize the machine. The relative direction of the various components of excitation is indicated by arrows on the respective field exciting windings.

In Fig. 2 is shown another embodiment of my invention wherein an engine 51 is arranged to drive a main generator provided with an armature 52 connected to supply power to series traction driving motors 53. As in Fig. 1, the characteristics of the main generator are controlled by a main field exciting winding 54, and a commutating field exciting winding 55 is connected in series with the main load circuit of the main generator. The field exciting winding 54 is adapted to be energized by an armature reaction excited dynamo-electric machine or amplidyne exciter 56, the secondary or load brushes 57 and 58 of which are connected in series with the field exciting winding 54, an exciter compensating winding 59, and a resistance 60 in opposition to the voltage of the main generator 52. A primary circuit is completed through the amplidyne exciter armature 56 by short-circuiting primary brushes 61 and 62 of the machine by an external conductor 63.

In order to obtain the desired substantially constant power engine output or generator input characteristic, that is, generator power output together with the losses of the electrical system and machines as represented by the engine output curve a in Fig. 3, the main generator characteristic is regulated by controlling the energization of the main field exciting winding 54 through the control of the amplidyne exciter. A control field exciting winding 64 is arranged to provide the controlling excitation to the amplidyne exciter and is energized by a suitable source of electrical power supply including a battery 65 in series with and in opposition to a speed responsive source of electrical potential provided by a substantially unsaturated pilot generator 66. This pilot generator is arranged to provide an electric voltage substantially responsive to the speed of the engine 51 by being driven at a speed proportional to the engine speed. Since the voltage of the battery 65 may vary with its charge and its internal voltage drop, the pilot generator 66 is excited by a field exciting winding 67 connected through a resistance 68 across the battery 65. This assures a substantially constant voltage relationship between the battery 65 and the generator 66 irrespective of the battery voltage.

Different patterns of characteristics may be obtained by varying the throttle position of the engine 51. The excitation of the main generator 52 is controlled directly by connecting a throttle control lever 69 to a battery voltage bias control member 70 which controls the voltage impressed on the amplidyne exciter field exciting winding 64 from the battery 65 by varying the battery voltage drop between a terminal 71 and the control member 70 on a potentiometer resistance 72 connected across the battery 65. Under normal operating conditions, the amplidyne exciter control field exciting winding 64 is connected across the battery potentiometer 72 in series with the pilot generator 66 opposed to the battery voltage through a rectifier 73, such as copper oxide rectifier, to prevent reversal of current through this circuit if the pilot generator voltage should tend to drop below the battery voltage, and through two relays having contacts 74 and 75 closed by contactors 76 and 77, respectively. Variations in engine speed tend to produce corresponding variations in the pilot exciter voltage and, therefore, in the energizations of the exciter field exciting winding 64. This is reflected by the amplidyne exciter in corresponding variations in the energization of the main generator field exciting winding 54, thereby tending to increase the load on the main generator 52 if its speed increases and to decrease the load thereon if its speed decreases. Should the speed of the main generator fall below a predetermined value such that the voltage of the pilot exciter 66 falls below the battery voltage, the field exciting winding 64 will be completely deenergized, for the blocking rectifier 73 will prevent a reversal of current through the field exciting winding 64. This is necessary in order to assure the building up of the amplidyne exciter with the right polarity.

Under certain conditions, the speed of the engine might be changed very rapidly, as by quick change of the throttle position, and the excitation of the main generator 52 might not be sufficient to prevent overspeeding of the engine, particularly since the battery voltage would be suddenly increased before the pilot generator voltage would have time to build up, with the result that the field exciting winding 64, and consequently the main field exciting winding generator 54, would be substantially deenergized, thereby removing all load from the main generator and the engine. In order to prevent this undesirable condition, a field exciting winding 78 is arranged on the amplidyne exciter and connected through a condenser 79 directly across the pilot exciter 66. Thus, when there is a sudden change in the voltage of the pilot exciter, this field exciting winding 78 is energized rapidly to provide a rapid change in a corresponding sense in the excitation of the amplidyne exciter, thereby providing for the rapid increase or decrease in the energization of the main generator field exciting winding 54 and a corresponding rapid change in the load on the main generator to prevent unloading or overloading of the engine.

It is desirable that transient variations in the amplidyne exciter circuit should not affect its operation, and a field exciting winding 80 is arranged on the amplidyne exciter secondary commutating axis connected directly across its secondary circuit through a condenser 81 and a shunting resistance 82 to provide a component of excitation along the secondary commutating axis of the machine in opposition to the control component of excitation provided by the field exciting winding 64. This field exciting winding 80 is slightly energized at all times through the resistance 82 and transient variations cause the condenser 79 to provide an energization to the field exciting winding 78, tending to oppose such changes and to stabilize the operation of the machine.

In order to prevent damage to the system, it is desirable that the maximum load current on the main generator should be limited to a predetermined maximum value. This protection is provided by arranging the contactor 76 to operate in response to a predetermined voltage drop across the commutating field exciting winding 55 of the main generator as this drop is proportional to the main load current. The contactor 76 is arranged to be operated by a relay coil 83 connected in series with a transformer winding 84 across the main generator commutating field exciting winding 55 and in series with a variable control resistance 85. The transformer is provided with a secondary winding 86 connected across the secondary brushes 57 and 58 of the amplidyne exciter 56, such that the relay contactor 76 will vibrate whenever the load current reaches a predetermined maximum value. This causes the contactor 76 to deenergize the amplidyne exciter control field exciting winding 64 periodically and causes the main generator to drop its load. Thus, this relay will vibrate to limit the load on the main generator, so as to limit automatically and inherently the maximum load current and power output of the main generator and will provide a characteristic thereto which is represented in Fig. 3 by the curves $c$—$f$ and $e$—$f$.

In order to prevent overheating of the main generator field exciting winding 54 by excessive current, the contactor 77 is arranged to be operated by relay coil 87 connected in series with a transformer winding 88 across the resistance 60 which is in series with the generator field exciting winding 54. Thus, the voltage across the transformer winding 88 and the relay coil 87 is directly proportional to the current in the field exciting winding. The transformer is provided with a secondary winding 89 connected across the secondary of the amplidyne exciter such that if the current in the field exciting winding 54 exceeds a predetermined value, the relay coil 87 will open the contactor 77 to deenergize the main generator field exciting winding 54 and automatically limit its maximum energization current. This, however, causes the relay coil 87 to be deenergized, thereby reclosing the contactor 77 on the contacts 78. This operation is indicated in Fig. 3 by curves $g$—$b$ and $h$—$d$. Since the inductances of a system are such that the relay coils 83 and 87 may not respond as rapidly as desired if merely connected across the controlling voltages, the transformer connections described above are provided to assure a more rapid response, and these transformers are connected directly across the amplidyne exciter and are immediately responsive to the variations produced by the operation of the relays.

In order to start the main generator, it is provided with a field exciting winding 90 connected in series with a starting switch 91, and is adapted to be connected across the battery 65 in series with the main generator armature 52 by closing the switch 91. Under normal operating conditions, the switch 91 remains open.

While I have illustrated and described particular embodiments of my invention, modifications thereof will occur to those skilled in the art and I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An excitation system for a dynamo-electric machine in a power system including a field exciting winding, dynamo-electric means arranged to energize said field exciting winding, and means for varying the energization provided by said dynamo-electric means to regulate the power output of the dynamo-electric machine to a value such that said power output together with the losses of said power system and said machine is a substantially constant value within a given range of current and voltage variations below a predetermined electric current, said dynamo-electric means including means for varying the energization of said dynamo-electric machine field exciting winding for limiting the electric current of said dynamo-electric machine to a predetermined maximum value.

2. An excitation system for a dynamo-electric machine in a power system including a field exciting winding, dynamo-electric means arranged to energize said field exciting winding, and means for varying the energization provided by said dynamo-electric means to regulate the power output of the dynamo-electric machine to a value such that said power output together with the losses of said power system and said machine is a substantially constant value within a given range of current and voltage variations below a predetermined electric current, said dynamo-electric means including means for varying the energization of said dynamo-electric machine field exciting winding for limiting the electric current of said dynamo-electric machine to a predetermined maximum value, said means being arranged to limit the energization of said field exciting winding substantially to a predetermined maximum value.

3. An excitation system for a dynamo-electric machine in a power system including a field exciting winding, dynamo-electric means arranged to energize said field exciting winding, and means for varying automatically the energization provided by said dynamo-electric machine to regulate the power output of the dynamo-electric machine to a value such that said power output together with the losses of said power system and said machine is a substantially constant value within a given range of current and voltage variations below a predetermined electric current, said dynamo-electric means including means for varying the energization of said dynamo-electric machine field exciting winding for limiting automatically the electric current of said dynamo-electric machine to a predetermined maximum value, said means being arranged to limit automatically the energization of said field exciting winding substantially to a predetermined maximum value.

4. A power system including a prime mover, a main electric generator driven by said prime mover, an excitation system for said main generator including a field exciting winding, dynamo-electric means arranged to energize said field exciting winding, and means for varying the energization provided by said dynamo-electric means to regulate the power output of said main generator to a value such that said power output together with the losses of said power system and said machine is a substantially constant value within a given range of current and voltage variations below a predetermined value of electric current, said dynamo-electric means including means for varying the energization of said generator field exciting winding for limiting the electric current of said main generator substantially to a predetermined maximum value, said last-mentioned means being adapted to limit the energization of said main generator field exciting winding substantially to a predetermined maximum value.

5. An excitation system for a dynamo-electric machine of a power system including a field exciting winding, an auxiliary dynamo-electric machine arranged to energize said field exciting winding, means including a second field exciting winding for varying the energization provided by said auxiliary dynamo-electric machine to regulate inherently the power output of said first-mentioned dynamo-electric machine to a value such that said output together with the losses of said power system and said machine is a substantially constant value within a given range of current and voltage variations below a predetermined value of electric current, means for varying the energization provided by said auxiliary dynamo-electric machine to vary inherently the current of said first-mentioned dynamo-electric machine when the electric current thereof tends to exceed said predetermined value, and means for limiting the energization of said first-mentioned field exciting winding substantially to a predetermined maximum value.

6. An excitation system for a dynamo-electric machine of a power system including a field exciting winding, an auxiliary dynamo-electric machine arranged to energize said field exciting winding, means responsive to the speed of said first-mentioned dynamo-electric machine for varying the energization provided by said auxiliary dynamo-electric machine to regulate inherently the power output of said first-mentioned dynamo-electric machine to a value such that said output together with the losses of said power system and said machine is a substantially constant value within a given range of current and voltage variations below a predetermined value of electric current, means for varying the energization provided by said auxiliary dynamo-electric machine to vary inherently the current of said first-mentioned dynamo-electric machine when the electric current thereof tends to exceed said predetermined value, and means for limiting the energization of said first-mentioned field exciting winding substantially to a predetermined value.

7. An excitation system for a dynamo-electric machine of a power system including a field exciting winding, an auxiliary dynamo-electric machine arranged to energize said field exciting winding, means including a second field exciting winding arranged to be energized substantially responsive to the power of said power system for varying the energization provided by said auxiliary dynamo-electric machine to regulate inherently the power output of said first-mentioned dynamo-electric machine to a value such that said power output together with the losses of said power system and said machine is a substantially constant value within a given range of current and voltage variations below a predetermined value of electric current, means for varying the energization provided by said auxiliary dynamo-electric machine to vary inherently the current of said first-mentioned dynamo-electric machine when the electric current thereof tends to exceed said predetermined value, and means for inherently limiting the energization provided by said auxiliary dynamo-electric machine to said first-mentioned field exciting winding substantially to a predetermined maximum value.

8. An excitation system for a dynamo-electric machine of a power system including a field exciting winding, an auxiliary dynamo-electric machine arranged to energize said field exciting winding, means including a second field exciting winding for said auxiliary dynamo-electric machine for varying the energization provided by said auxiliary dynamo-electric machine to regulate inherently the power output of said first-mentioned dynamo-electric machine to a value such that said output together with the losses of said power system and said machine is a substantially constant value within a given range of current and voltage variations below a predetermined value of electric current, means for varying the energization provided by said auxiliary dynamo-electric machine to vary inherently the current of said first-mentioned dynamo-electric machine when the electric current thereof tends to exceed said predetermined value, and means for limiting the energization of said first-mentioned field exciting winding substantially to a predetermined maximum value.

9. An excitation system for a dynamo-electric machine of a power system including a field exciting winding, an auxiliary dynamo-electric machine arranged to energize said field exciting winding, means including a second field exciting winding for varying the energization provided by said auxiliary dynamo-electric machine to regulate automatically the power output of said first-mentioned dynamo-electric machine to a value such that said output together with the losses of said power system and said machine is a substantially constant value within a given range of current and voltage variations below a predetermined value of electric current, and means including a third field exciting winding for varying the energization provided by said auxiliary dynamo-electric machine to vary automatically the current of said first-mentioned dynamo-electric machine when the electric current thereof tends to exceed said predetermined value.

10. An excitation system for a dynamo-electric machine of a power system including a field exciting winding, an auxiliary dynamo-electric machine arranged to energize said field exciting winding, means including a second field exciting winding for varying the energization provided by said auxiliary dynamo-electric machine to regulate automatically the power output of said first-mentioned dynamo-electric machine to a value such that said output together with the losses of said power system and said machine is a substantially constant value within a given range of current and voltage variations below a predetermined value of electric current, and means including a third field exciting winding for varrying the energization provided by said auxiliary dynamo-electric machine to vary automatically the current of said first-mentioned dynamo-electric machine when the electric current thereof tends to exceed said predetermined value, said last-mentioned means also being adapted to limit automatically the energization of said first-mentioned field exciting winding substantially to a predetermined maximum value.

11. An excitation system for a dynamo-electric machine of a power system including a field exciting winding, an auxiliary dynamo-electric machine arranged to energize said field exciting winding, means including a second field exciting winding for varying the energization provided by said auxiliary dynamo-electric machine to regulate the power output of said first-mentioned dynamo-electric machine to a value such that said output together with the losses of said power system and said machine is a substantially constant value within a given range of current and voltage variations below a predetermined value of electric current, and means including a third field exciting winding for varying the energization provided by said auxiliary dynamo-electric machine to vary the current of said first-mentioned dynamo-electric machine when the electric current thereof tends to exceed said predetermined value, said last-mentioned means also being adapted to limit the energization of said first-mentioned field exciting winding substantially to a predetermined maximum value.

12. An excitation system for a dynamo-electric machine of a power system including a field exciting winding, an auxiliary dynamo-electric machine arranged to energize said field exciting winding, means including a second field exciting winding for said auxiliary dynamo-electric machine for varying the energization provided by said auxiliary dynamo-electric machine to regulate inherently the power output of said first-mentioned dynamo-electric machine to a value such that said output together with the losses of said power system and said machine is a substantially constant value within a given range of current and voltage variations below a predetermined value of electric current, a third field exciting winding for said auxiliary dynamo-electric machine, and means for varying the energization provided by said auxiliary dynamo-electric machine to limit the current of said first-mentioned dynamo-electric machine to a predetermined maximum value.

13. An excitation system for a dynamo-electric machine of a power system including a field exciting winding, an auxiliary dynamo-electric machine arranged to energize said field exciting winding, means including a second field exciting winding for said auxiliary dynamo-electric machine for varying the energization provided by said auxiliary dynamo-electric machine to regulate inherently the power output of said first-mentioned dynamo-electric machine to a value such that said output together with the losses of said power system and said machine is a substantially constant value within a given range of current and voltage variations below a predetermined value of electric current, a third field exciting winding for said auxiliary dynamo-electric machine, means for varying the energization provided by said auxiliary dynamo-electric machine to limit the current of said first-mentioned dynamo-electric machine to a predetermined maximum value, and means for varying the energization of said third field exciting winding for limiting the energization of said first-mentioned field exciting winding substantially to a predetermined maximum value.

14. An excitation system for a dynamo-electric machine of a power system including a field exciting winding, an auxiliary dynamo-electric machine arranged to energize said field exciting winding, means including a second field exciting winding for said auxiliary dynamo-electric machine for varying the energization provided by said auxiliary dynamo-electric machine to regulate the power output of said first-mentioned dynamo-electric machine to a value such that said output together with the losses of said power system and said machine is a substantially constant value within a given range of current and voltage variations below a predetermined value of electric current, and means including a third field exciting winding for varying the energization provided by said auxiliary dynamo-electric machine to vary the current of said first-mentioned dynamo-electric machine when the electric current thereof tends to exceed said predetermined value, said last-mentioned means also being adapted to limit the energization of said first-mentioned field exciting winding substantially to a predetermined maximum value.

15. An excitation system for a dynamo-electric machine of a power system including a field exciting winding, an auxiliary dynamo-electric machine arranged to energize said field exciting winding, means including a second field exciting winding for said auxiliary dynamo-electric machine for varying the energization provided by said auxiliary dynamo-electric machine to regulate automatically the power output of said first-mentioned dynamo-electric machine to a value such that said output together with the losses of said power system and said machine is a substantially constant value within a given range of current and voltage variations below a predetermined value of electric current, and means including a third field exciting winding for varying the energization provided by said auxiliary dynamo-electric machine to vary automatically the current of said first-mentioned dynamo-electric machine when the electric current thereof tends to exceed said predetermined value, said last-mentioned means also being adapted to limit automatically the energization of said first-mentioned field exciting winding substantially to a predetermined maximum value.

16. An excitation system for a dynamo-electric machine of a power system including a field exciting winding, an auxiliary dynamo-electric machine arranged to energize said field exciting winding, means including a second field exciting winding for said auxiliary dynamo-electric machine for varying the energization provided by said auxiliary dynamo-electric machine to regulate inherently the power output of said first-mentioned dynamo-electric machine to a value such that said output together with the losses of said power system and said machine is a substantially constant value within a given range of current and voltage variations below a predetermined value of electric current, means including a third field exciting winding for said auxiliary dynamo-electric machine for varying the energization provided by said auxiliary dynamo-electric machine to vary inherently the current of said first-mentioned dynamo-electric machine when the electric current thereof tends to exceed said predetermined value, and means including said third field exciting winding for limiting the energization of said first-mentioned field exciting winding substantially to a predetermined maximum value.

17. An excitation system for a dynamo-electric machine of a power system including a field exciting winding, an auxiliary dynamo-electric machine arranged to energize said field exciting winding, means including a second field exciting winding for said auxiliary dynamo-electric machine arranged to be energized substantially responsive to the power of said power system for varying the energization provided by said auxiliary dynamo-electric machine to regulate inherently the power output of said first-mentioned dynamo-electric machine to a value such that said power output together with the losses of said power system and said machine is a substantially constant value within a given range of current and voltage variations below a predetermined value of electric load current thereof, and means for varying the energization provided by said auxiliary dynamo-electric machine to limit the current of said first-mentioned dynamo-electric machine to a predetermined maximum value.

18. An excitation system for a dynamo-electric machine of a power system including a field exciting winding, an auxiliary dynamo-electric machine arranged to energize said field exciting winding, means including a second field exciting winding for said auxiliary dynamo-electric machine arranged to be energized substantially responsive to the power of said power system for varying the energization provided by said auxiliary dynamo-electric machine to regulate inherently the power output of said first-mentioned dynamo-electric machine to a value such that said power output together with the losses of said power system and said machine is a substantially constant value within a given range of current and voltage variations below a predetermined value of electric load current thereof, means for varying the energization provided by said auxiliary dynamo-electric machine to limit the current of said first-mentioned dynamo-electric machine to a predetermined maximum value, and means responsive to the energization of said first-mentioned field exciting winding for varying the energization of said second field exciting winding for limiting the energization of said first-mentioned field exciting winding substantially to a predetermined maximum value.

19. An excitation system for a dynamo-electric machine of a power system including a field exciting winding, an auxiliary dynamo-electric machine arranged to energize said field exciting winding, means including a second field exciting winding for said auxiliary dynamo-electric machine for varying the energization provided by said auxiliary dynamo-electric machine to regulate inherently the power output of said first-mentioned dynamo-electric machine to a value such that said output together with the losses of said power system and said machine is a substantially constant value within a given range of current and voltage variations below a predetermined value of electric current, means dependent on the load current of said first-mentioned dynamo-electric machine for varying the energization provided by said auxiliary dynamo-electric machine to limit the current of said first-mentioned dynamo-electric machine to a predetermined maximum value, and means dependent on the energization of said first-mentioned field exciting winding for varying the energization of said second field exciting winding for limiting the energization of said first-mentioned field exciting winding substantially to a predetermined maximum value.

MARTIN A. EDWARDS.